United States Patent [19]

Berkstresser

[11] Patent Number: 4,526,392
[45] Date of Patent: Jul. 2, 1985

[54] RECUMBENT VELOCIPEDE
[76] Inventor: David E. Berkstresser, 2119 W. 235 St., Torrance, Calif. 90501
[21] Appl. No.: 441,934
[22] Filed: Nov. 15, 1982
[51] Int. Cl.³ .......................... B62K 5/04; B62K 17/00
[52] U.S. Cl. .............................. 280/281 LP; 280/269; 280/282
[58] Field of Search .................. 280/220; 22/221, 226, 22/227, 235, 266, 267, 269, 281, 281 LP, 281 W, 282

[56] References Cited

U.S. PATENT DOCUMENTS

| | | | |
|---|---|---|---|
| 3,442,528 | 5/1969 | Rapemacher | 280/87.04 |
| 3,620,547 | 11/1970 | Vaverec | 280/87.04 |
| 3,669,468 | 1/1970 | Rich | 280/267 |
| 3,746,118 | 7/1971 | Altorfer | 180/25 R |
| 3,981,516 | 9/1976 | Häggkvist | 280/282 |
| 4,132,435 | 1/1979 | Wilson | 280/282 |
| 4,186,935 | 2/1980 | Rudwick | 280/269 |
| 4,198,072 | 4/1980 | Hopkins | 280/281 LP |
| 4,279,429 | 7/1981 | Hopkins et al. | 280/281 LP |
| 4,359,231 | 11/1982 | Mulcahy | 280/281 LP |
| 4,432,561 | 2/1984 | Feikema | 280/281 LP |

Primary Examiner—Joseph F. Peters, Jr.
Assistant Examiner—Donn McGiehan

[57] ABSTRACT

A rear steered vehicle with improved handling and stability described by having a single front driven wheel and a pair of steered rear wheels. Cornering ability is improved while maintaining a narrow overall width by allowing the rider, front wheel, and frame to lean "into" turns thereby shifting the vehicle's center of gravity to the inside of a turn. Stability at all speeds is improved over other rear steered vehicles by the steering design which rotates the two rear wheels on separate steering axes and the lack of mechanical connection between "leaning" and "steering." This allows the correct ratio of steering and leaning at all speeds. In practice, the rider will "lean" into a turn at any speed and the rear steering geometry will react to the weight transfer and steer the correct amount to maintain stability without additional input from the rider. For extremely low speed maneuvering, the rider still has precise control of the steering due to the design of the handlebars which allow the rider to use them either for leverage to control the amount of "lean" as they remain level independent of the degree of rider/frame "lean", or to steer the rear wheels directly by rotating the handlebars as a unit around a vertical axis.

7 Claims, 5 Drawing Figures

RECUMBENT VELOCIPEDE

BACKGROUND

One of the problems inherent in any type of lightweight, low power vehicle such as a bicycle is a high ratio of aerodynamic drag to power output. A bicycle being ridden at 30 mph has about 90% of it's power used to push air out of the way. Trying to overcome this problem has led to the development of many types of low frontal area velocipedes that reduce aerodynamic drag but have many new problems associated with them. Some of these problems are large turning radius, poor cornering, poor braking, wide track, long wheelbase, heavy construction, and dynamic instability. These problems cause difficulties using the vehicles in traffic, parking, maneuvering, or operating on hilly terrain or at high speeds, therefore, present designs have shown little overall advantage over conventional bicycles.

In order to overcome these problems a vehicle is needed which provides narrow overall width, short wheelbase, high cornering speeds with a small turning circle, and light, stable configuration. A common design locates a pair of steered wheels at the front of a vehicle and one or two driven wheels at the rear with a supine or recumbent rider located in-between. This design exhibits a conflict between narrow track and hard cornering ability and also a complex trade-off between turning radius, wheelbase length, track width, and construction weight. A differing and uncommon design, possibly better able to meet these critera, is a tricycle design wherein the rider is in a recumbent position. A front wheel, driven but unsteered, is located between his feet, and a pair of steered rear wheels are located below and behind the rider. Hard cornering can be attained while still retaining a narrow track by allowing the rider to lean "into" the corner. A small turning circle is attained both by the short wheelbase and the ability to have the steered wheels turn a sharp angle.

Assorted vehicle designs that utilize the tipping and rear steering approach have been developed. Altorfer, U.S. Pat. No. 3,746,118 shows a vehicle with improved cornering due to a shifted center of gravity caused by tipping the rider and part of the vehicle. Rich, U.S. Pat. No. 3,669,468 takes this a step further with a front drive, rear steered tricycle that tips proportionately with the steering angle and is meant as a low speed child's toy.

A more advanced design is disclosed by Hopkins, U.S. Pat. No. 4,198,072. This design incorporates a driven front wheel that does not steer, but which does tip with the frame and rider to change the center of gravity, a pair of steered rear wheels, and the rider in a recumbent position. Hopkins uses a solid, transverse, steered rear axle with a small wheel on each end and a linkage which forces the frame to tip proportionately to the steering angle, similar to Rich, but with an additional control movement that alters the proportion in such a way that the rider can choose the ratio of tipping to steering that he judges necessary for his speed.

My new method differs by using an improved rear geometry that allows any wheel size to be used and greatly improves the stability at speed by reacting to the dynamic forces caused by cornering, speed, gravity, and road surface. The means to control tipping and steering also have no mechanical connection between them in order that the improved stability can be utilized.

SUMMARY

The intention of this invention is to be a vehicle that can generally be used in the same manner as a conventional bicycle, moped, or motorcycle, preserving their good points and improving some of their weaker points, specifically aerodynamic drag and handling.

This vehicle can be described as a recumbent tricycle in which the rider is in a substantially recumbent position near the ground surface with a single, unsteered, driven front wheel located between the rider's feet or legs, a pair of steered rear wheels located behind the rider, and a linkage allowing the front of the vehicle including the rider and the front wheel to lean "into" a turn while the rear wheels, maintaining their lateral spacing, both remain in contact with the ground surface.

The vehicle is operated in a similar manner as a bicycle with many of the same instinctive control inputs. To initiate a low speed turn, the rider simply leans or tips the front of the vehicle enough to maintain balance, and steers by exerting force on the handlebar. As speeds increase, the rider can lean into the turn and exert less pressure on the handlebar, allowing the vehicle to respond to the weight transfer similar to the way a bicycle would.

The characteristic of the geometry that allows accurate steering by weight transfer at all speeds also creates very good high speed stability and predictability during cornering or straight travel, and aided by the tricycle geometry and a low profile, allows high braking forces with no instability. Because the vehicle can lean into turns for hard cornering, the rear track need not be wider than the rider and due to the front wheel location, the wheelbase can also be relatively short. This yields a configuration that cuts aerodynamic drag due to its small frontal area and overall size, and which will conveniently accept a streamlining faring while both retaining and improving the characteristics of a bicycle, moped, or motorcycle.

DESCRIPTION OF THE PREFERRED EMBODIMENT

Figure 1:
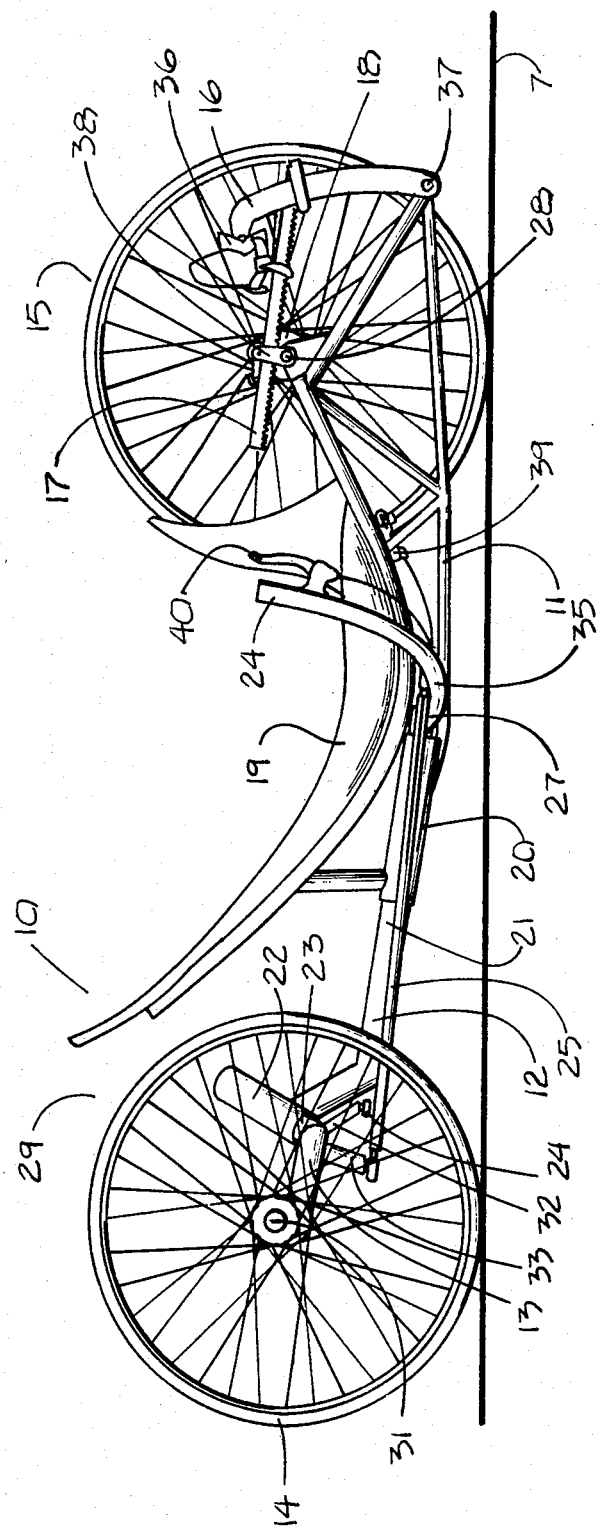
FIG. 1 is an elevation view of the preferred embodiment of this invention.
Figure 2:
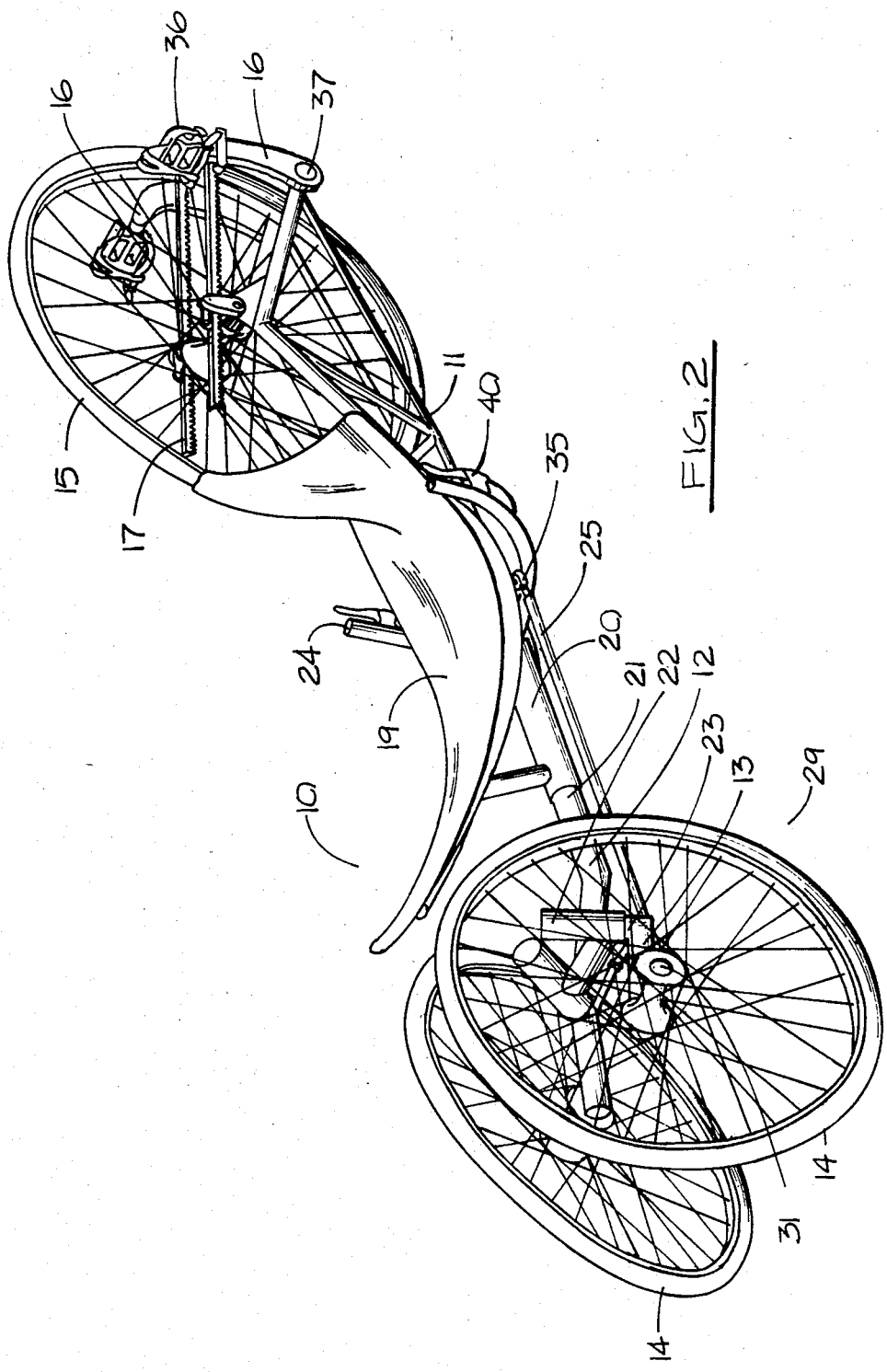
FIG. 2 is an isometric view facing the right rear corner of the vehicle while it is in a configuration corresponding to straight line travel.

A preferred embodiment of the present vehicle is generally indicated as 10 in FIGS. 1 through 5. The vehicle 10 is of a tricycle configuration with the rider located close to the ground plane 7 in a recumbent position, a single front wheel 15 located between the rider's legs, and a pair of steered rear wheels 14 located behind the rider. In operation, the front wheel 15 is driven and the rear wheels 14 perform the steering function. In order to facilitate hard cornering the vehicle's center of gravity can be shifted in relation to the contact points of the wheels 14 and 15 and the ground plane 7, toward the center of the turning circle. This is done by allowing the entire vehicle 10 with the exception of rear assembly 29 to rotate around a longitudinal axis near the ground plane 7, "leaning" or "tipping" into the turn, while the rear assembly 29 does not rotate, allowing the rear wheels 14 to retain contact with the ground plane 7. Note that the said longitudinal axis is defined by the tip axis tube 20 and tip axis core 21.

In more detail, the rider is supported in a substantially recumbent position by the seat 19 which is fixed to forward frame section 11. The front wheel 15 is mounted near the front of forward frame section 11, generally located between the legs of the rider, and allowed to rotate by suitable bearings on front wheel axle 28 which is rigidly mounted in a transverse orientation to forward frame section 11. A pair of steerable rear wheels 14 are located behind the rider, transverse symmetrically opposed and as near the seat 19 as possible without interference with the seat 19. Rear wheels 14 are mounted in a steerable manner as part of the rear assembly 29 which consists mainly of the rear wheels 14, the steering arms 13, and the rearward frame section 12. It may be noted from FIG. 4 that the rear wheels 14 may be mounted with some degree of negative camber.

The rear assembly 29 is connected to the front frame section in such a way that there can be a relative rotation between the forward frame section 11 and the rear assembly 29 on a longitudinal axis near the ground plane 7. This relative rotation takes place by allowing the tip axis tube 20 to rotate around the tip axis core 21 by suitable bearings. It may be noted that tip axis tube 20 is an integrated part of forward frame section 11 and tip axis core 21 is an integrated part of rearward frame section 12.

Figure 3:
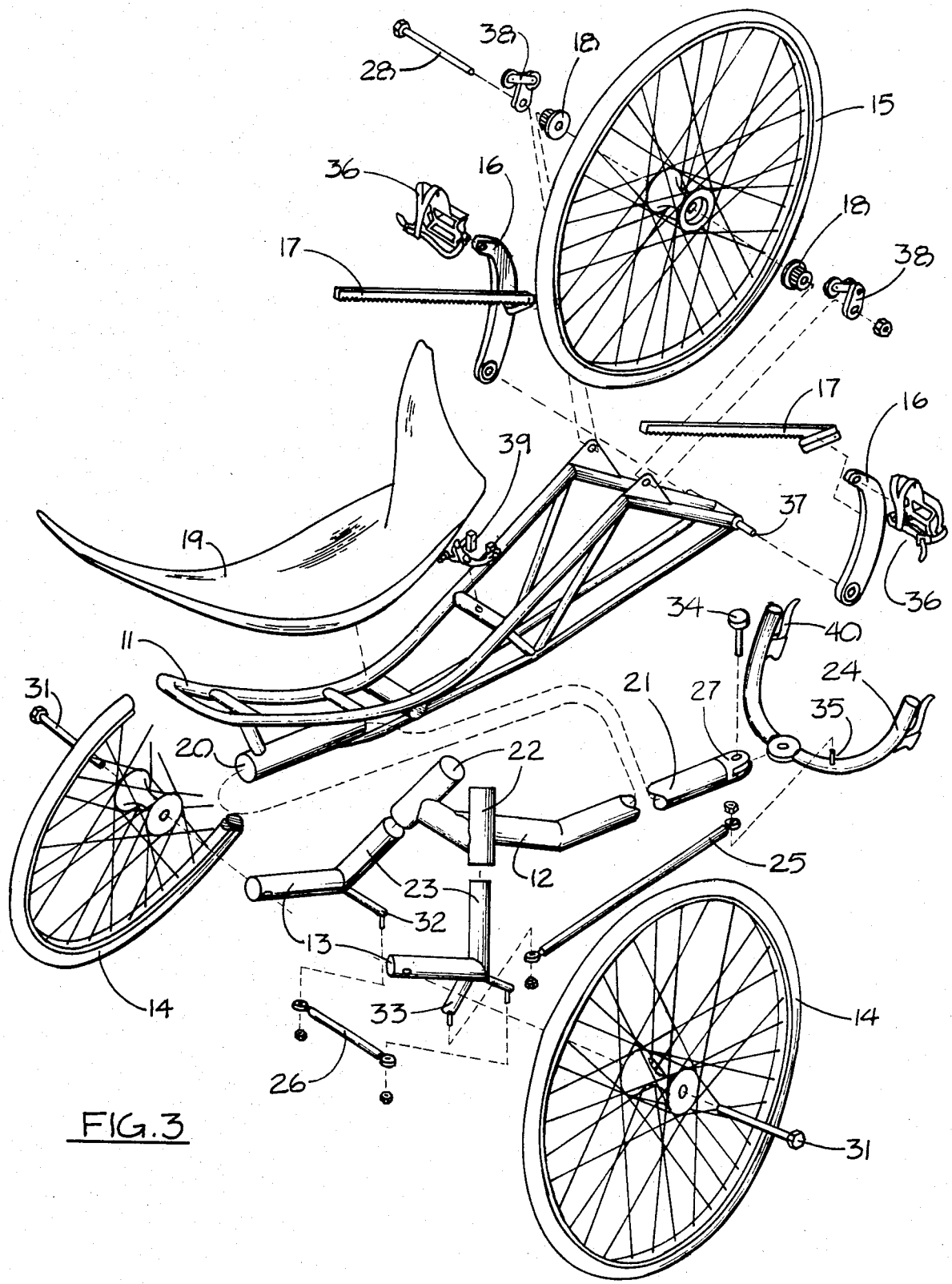
FIG. 3 is an isometric exploded view oriented similar to FIG. 2.
Figure 4:
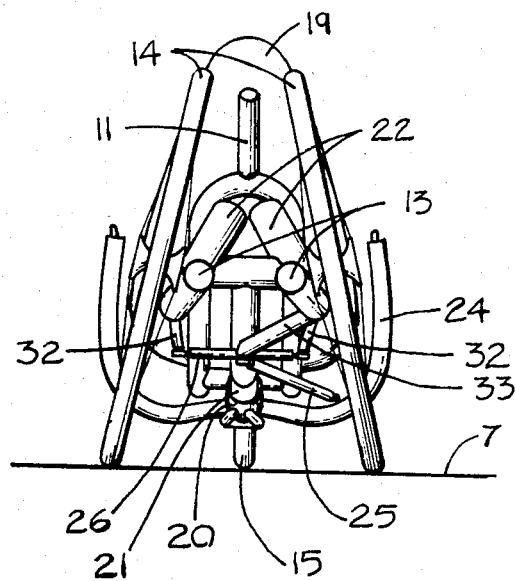
FIG. 4 is a rear elevation of the vehicle in straight travel configuration.
Figure 5:
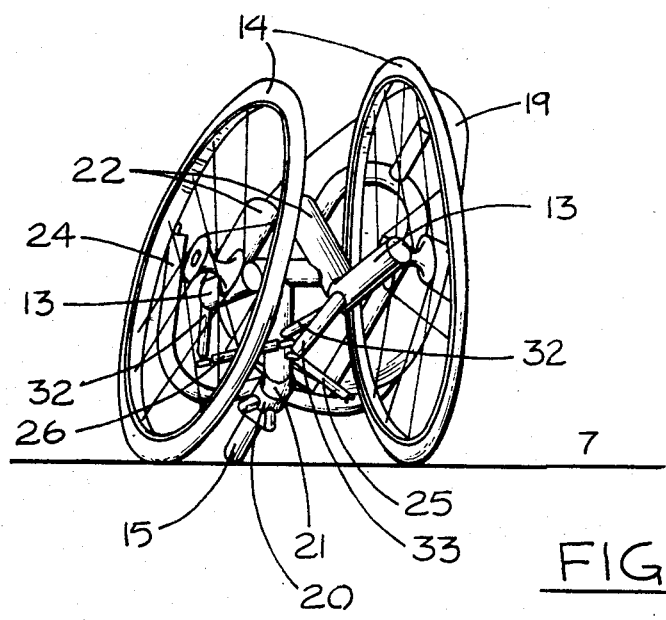
FIG. 5 is a rear elevation of the vehicle in a configuration corresponding to a right turn.

Steering is performed by the rear wheels 14, each of which is allowed to freely rotate via suitable bearings around an individual rear wheel stub axle 31 which is rigidly mounted to an individual steering arm 13. Each steering arm 13 has as an integrated part a steering axis core 23 which is journaled and allowed only to rotate in an individual steering axis tube 22 through suitable bearings. It can be noted that the two individual steering axis tubes 22 are integrated parts of rearward frame section 12. Integrated with each steering arm 13 is its own linkage lever 32 as seen in FIGS. 3 and 4. Steering pushrod 26 is connected to each linkage lever 32 through suitable spherical bearings. As a result of this linkage, a rotational displacement, in relation to the rearward frame section 12, of the right side steering arm 13 around the axis defined by the right side steering axis tube 22 will cause a proportional rotational displacement of the left side steering arm 13 around the axis defined by the left side steering axis tube 22. This linkage and geometry maintain the rear wheels 14 in a proper relation with each other and with the ground plane 7 over the full range of steering angles.

Two differing inputs cause a response in the steering system. The first is the force exerted on the rear wheels resulting from centrifugal forces produced while turning or the forces caused by the rider tipping the forward section and moving the center of gravity to one side. The rear geometry causes the vehicle to turn in the direction of the rear wheel that has the greater vertical load on it by rotating the rear wheels around their steering axes. The second steering input is the rider's direct control. With his hands the rider rotates the handlebar 24 around a vertical axis at the handlebar mounting joint 27. The handlebar mounting joint 27 is fixed at the end of the tip axis core 21 in such a way that there can be no relative rotation between them, and contains the vertical axis pin 34 which, via suitable bearings, allows the handlebar 24 to rotate around that axis. Rotation of the handlebar 24 causes movement in the steering pushrod 25 which is connected to the handlebar 24 at point 35 by a suitable spherical bearing. The far end of pushrod 25 is connected by a similar bearing to the steering lever 33 which is an integrated part of right side steering arm 13 as can be seen by FIGS. 3 and 4. With this linkage a clockwise rotation of the handlebar 24 causes a proportional rotation in right side steering arm 13 and a corresponding rotation in left side steering arm 13 and a resulting right turn by the vehicle. It should be noted that the travel of the end of the steering lever 33 lies approximately along the line of the tip axis so that relative tip axis rotation will cause little disturbance of the steering lever 33 and therefore little disturbance of the steering.

It should also be noted that since both rear wheels 14 remain in contact with the ground plane 7, the rearward frame section 12 will remain level with the ground plane 7, and therefore, the vertical axis pin and the axis it defines will remain vertical irrespective of the relative rotation of the forward frame section 11 or the rotation of the handlebar 24, therefore the handlebar ends also remain level with the ground plane 7. This gives the rider control of the rotation of the forward frame section 11 around the tip axis by giving the rider a stable base against which he can use the leverage of his arms while being firmly positioned in the seat.

Control is not necessarily limited to this method. Many other control methods are possible. For example; two independent levers could be used, as long as independent control of the tipping and the steering and the stable rear geometry remained. The method illustrated here is merely presently preferred.

A possible drivetrain illustrated in FIG. 1 consists of a pair of cranks 16 independently pivoted on the crank axis 37 by suitable bearings driving a pair of racks 17 attached to the cranks 16 by an appropriate means. The racks 17 drive the front wheel 15 through an appropriate system of pinions and overrunning clutches 18 with meshing insured by a pair of appropriate tensioners 38. Power is supplied by the legs of the rider pushing against a pair of pedals 36 attached to the cranks 16, retracting each system at the end of a power stroke in such a way that each foot affects a pumping motion.

A brake 39 with a hand actuating lever 40 mounted on the handlebar 24 similar to a conventional bicycle braking system is also shown, as is a viscous damper 41, useful for adjusting the response speed of the steering system.

To operate this vehicle the rider settles himself into the seat 19, rests his hands on the handlebar 24, and, holding the vehicle 10 upright with the leverage of his hands on the handlebar 24, places his feet on the pedals 36 and commences motion. Once moving, very little input is needed to keep the vehicle upright and moving in a straight line. To turn, the rider simply tips the vehicle the desired amount with a combination of leaning and handlebar leverage, and supplements the vehicle's tendency to turn in the direction of the tip, quickening the steering response with as much handlebar input as he wants. The vehicle will show a strong tendency to steer the correct amount required to maintain balance; an almost neutral tipping force is required in a sustained turn. Braking tends to draw the vehicle vertical and into a straight line.

The above description only illustrates a presently preferred embodiment with many improvements possible by anyone skilled in the art and without the exercise of inventive faculty. Therefore, the scope of the following claims defines the scope of the invention.

What is claimed is:

1. A wheeled vehicle comprised of:
    a frame assembly consisting of an elongated forward frame section and a relatively smaller rearward frame section;
    a single ground engaging front wheel associated with the forward frame section;
    a pair of transverse symmetrically opposed ground engaging rear wheels associated with the rearward frame section;
    the forward frame section linked with the rearward frame section in such a manner that the forward frame section and the rearward frame section can have a relative rotational displacement on a substantially longitudinal axis;
    the single front wheel located near the front of the forward frame section and constrained to rotate on an axle fixed in the transverse direction to the forward frame section;
    the rear wheels constrained to rotate on individual stub axles linked to the rearward frame section by pivotal members;
    steering of rear wheels accomplished by rotating said pivotal members on individual axes associated with the rearward frame section by appropriate linkage means, maintaining a specific relation between the rear wheels and the ground surface;
    a control linkage to control (a) the relative rotational displacement between the rearward frame section and the pivotal members around their individual axes for controlling rear wheel steer angle, and (b) the relative rotational displacement of the forward frame section and the rearward frame section around the longitudinal axis, without functions (a) and (b) mechanically linked.

2. The vehicle as defined by claim 1 wherein the relative locations of a seat and the front wheel axis are such that some portion of the front wheel is located between the rider's feet or legs.

3. The vehicle as defined by claim 2 wherein a means of driving a wheel is supplied.

4. The vehicle as defined by claim 3 wherein each axis associated with a pivotal member can be described as intersecting the ground plane, and as leaning in relation to vertical in a direction substantially forward and toward the vehicle centerline and in a fixed relation to the rearward frame section.

5. The vehicle as defined by claim 4 wherein a means of driving the front wheel is supplied.

6. The vehicle as defined by claim 5 wherein the front wheel is driven by a drive train whereby power is supplied by the rider's legs through an appropriate mechanism.

7. The vehicle as defined by claim 6 wherein the control linkage is a manually operated lever, originating under the seat and extending outward transversely in both directions so as to be a convenient resting place for the rider's hands, and fixed to the rearward frame section in such a manner that it may pivot around a vertical axis but not around a longitudinal axis in relation to the rearward frame section, rotational displacment of the lever around the vertical axis causing a proportional steering response in the rear wheels by means of the linkage and giving the rider a stable basis to use the rider's arm leverage to control the relative rotational displacement of the forward frame section and the rearward frame section around the longitudinal axis.

* * * * *